(12) United States Patent
Cameron (10) Patent No.: US 6,750,805 B1
(45) Date of Patent: Jun. 15, 2004

(54) FULL POLARIZATION SYNTHETIC APERTURE RADAR AUTOMATIC TARGET DETECTION ALGORITHM

(75) Inventor: William L. Cameron, Renton, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/324,769

(22) Filed: Dec. 20, 2002

(51) Int. Cl.$^7$ ............................................... G01S 13/04
(52) U.S. Cl. ............................ 342/90; 342/25; 342/195
(58) Field of Search ............................. 342/25, 90, 195

(56) References Cited

U.S. PATENT DOCUMENTS 5,339,082 A * 8/1994 Norsworthy .................. 342/90
6,437,728 B1 * 8/2002 Richardson et al. .......... 342/90

OTHER PUBLICATIONS

H. Fain and W.L. Cameron, Full Polarimetric Display of NASA/JPL AIRSAR P–Band Data from Gilmore Creek, AK (1993), Half Moon Bay, CA (1994), and Bishop, CA (1995), tech. rep., 1997, Boeing Defense and Space Group, Seattle, Washington, United States.

W.L. Cameron, Nazih N. Youssef and Ling K. Leung, Simulated Polarimetric Signatures of Primitive Geometrical Shapes, IEEE Transactions on Geoscience and Remote Sensing, May 1996, vol. 34, No. 3, Seattle, Washington, United States.

W.L. Cameron and Ling K. Leung, Identification of Elemental Polarimetric Scatterer Responses in High–resolution ISAR and SAR Signature Measurements, Sep. 8–10, 1992, Secondes Journees Internationales de la Polarimetric Radar, IRESTE, Nantes, France.

W.L. Cameron, Information Content of Linear vs. Circular for Dual Polarization Measurements, tech. rep., 1996, Boeing Phantom Works, Seattle, Washington, United States.

W.L. Cameron, Feature Motivated Polarization Scattering Matrix Decomposition, May 7–10, 1990, IEEE 1990 International Radar Conference Record, Arlington, Virginia, United States.

W.L. Cameron, MMW Polarimetric Features for Automatic Target Recognition, Nov. 2–4, 1993, Workshop on the Electromagnetics of Combat–induced Atmospheric Obscurants, El Paso, Texas.

Dr. Michael D. Arthur, Effectiveness of Atmospheric Obscurants on Polarimetric Automatic Target Recognition, Jul. 15, 1994, The Boeing Defense and Space Group, Seattle, Washington, United States.

* cited by examiner

Primary Examiner—Ian L. Lobo
(74) Attorney, Agent, or Firm—Black Lowe & Graham PLLC (57) ABSTRACT

A method, apparatus and computer-readable medium having stored thereon instructions for automatic detection of desired targets from radar data are disclosed. For each working point in a set of radar data, from a scattering matrix derived from collected radar data, a working total radar cross section and a working asymmetry angle are calculated. The working total radar cross section and the working asymmetry angle are then evaluated to determine whether the working point should be classified as a target point or a clutter point. The method and apparatus suitably may employ a two-dimensional table of total radar cross sections and asymmetry angles previously classified as signifying target points or clutter points. Reading from the look-up table, the working point is classified as a target point or a clutter point.

56 Claims, 6 Drawing Sheets

FULL POLARIZATION SYNTHETIC APERTURE RADAR AUTOMATIC TARGET DETECTION ALGORITHM

RELATED APPLICATION

This patent application is related to concurrently-filed patent application Ser. No. 10/356,224, pending entitled "FULL POLARIZATION GROUND MOVING TARGET INDICATOR RADAR AUTOMATIC TARGET DETECTION ALGORITHM," which is incorporated by reference.

FIELD OF THE INVENTION

This invention relates generally to radio detecting and ranging (radar) systems and, more specifically, to processing radar signals to automatically detect targets.

BACKGROUND OF THE INVENTION

Currently developed automatic radar target detection systems generally lack accuracy needed for effective target detection. In particular, space-based radar systems may miss many targets or, on the other hand, may yield high false alarm rates. Generally speaking, current radar transducing technology is capable of providing the data needed to manually and automatically detect targets with greater accuracy. However, methods and systems used to process that data cannot automatically detect targets with sufficient accuracy.

As a result of the shortcomings of automatic target detection, aerial radar platforms relay image data to ground stations where human analysts manually inspect the image data for targets. This process is costly in many ways. Manual verification necessitates increased transmission bandwidth to get the image data to the human analysts. Further, staff of analysts presents considerable manpower and facilities costs. Moreover, this costly process is time-consuming, and therefore undermines the value of the resulting analysis. By the time an analyst receives, reviews, and renders a conclusion, the target may have moved, possibly out of range of further tracking and/or prosecution.

Current automatic target detection research tends to concentrate on systems based on single polarization radar systems. Single polarization radar provides only a single set of planar transmit and receive data. Thus, it is more manageable for processing purposes than multiple polarization radar. Respecting limits of on-board processing systems of radar platforms, therefore, much research has been concentrated in how to better process single polarization radar data to identify targets.

Unfortunately, currently developed single polarization radar processing techniques have yet to yield satisfactory results. For example, the Defense Advanced Research Projects Agency (DARPA) has set as a goal having a detection probability rate of 98 percent, while having a false alarm rate on the order of 0.001 false alarms per square kilometer. However, current automatic target detection systems using single polarization radar with adequate sensitivity generally have false alarm rates of 2 false alarms per square kilometer. This false alarm rate is orders of magnitude higher than is desired.

Multiple polarization radar has the potential to enhance automatic detection of targets. Multiple polarization radar transmits and receives signals in both vertical and horizontal planes. Thus, multiple polarization radar yields four sets of data. These sets include two forms of single polarization data: vertical transmit/receive data and horizontal transmit/receive data. These sets also include two forms of cross polarization data: vertical transmit/horizontal receive data and horizontal transmit/vertical receive data. Accounting for the varied alignment and resulting reflection of signals by differently oriented targets, multiple polarization radar can potentially detect targets that single polarization radar might not. The wealth of data returned by multiple polarization radar also demands greater processing resources.

In an attempt to exploit multiple polarization radar without exceeding available on-board processing capabilities, current multiple polarization radar automatic detection systems have attempted to limit their processing to one or more yielded parameters, such as radar cross section. Unfortunately, limiting the processing to a single quantity has not resulted in the type of automatic detection accuracy desired. Similarly, combinations of quantities researched to date also have failed to result in desired accuracy within the capabilities of available processing systems.

Thus, there is an unmet need in the art for an automatic target detection algorithm that takes advantage of the data provided by multiple polarization synthetic aperture radar to yield greater sensitivity and low false alarm rates.

SUMMARY OF THE INVENTION

The present invention provides a system, method, and computer-readable medium having instructions stored thereon for processing radar signals to more accurately identify targets of interest. From data yielded by multiple polarization radar, targets can be detected with improved accuracy using only two quantities which can be readily calculated from the multiple polarization radar data. These calculated quantities can be compared to an empirically derived table indicating which combinations of values of these quantities do and do not indicate the presence of a desired target.

An exemplary embodiment of the present invention detects targets in radar signals by first calculating, for a working point in a working radar data, a working total radar cross section and a working asymmetry angle from a working scattering matrix. The working total radar cross section and the working asymmetry angle are then evaluated to determine whether the working point should be classified as a target point or a clutter point.

In a preferred embodiment, the working total radar cross section and the working asymmetry angle for the working point are evaluated through the use of a look-up table. The look-up table associates combinations of a total radar cross section and an asymmetry angle representing target points and clutter points based on previously classified combinations of total radar cross sections and asymmetry angles. In addition, synthetic aperture multiple polarization radar is employed to collect basis and working data from both vertical and horizontal single polarization planar transmit and receive data, and one or both cross polarization data scans. A look-up table is created empirically from calculated combinations of total radar cross sections and asymmetry angles, eliminating suspected cultural clutter points as desired.

BRIEF DESCRIPTION OF THE DRAWINGS

The preferred and alternative embodiments of the present invention are described in detail below with reference to the following drawings.

DETAILED DESCRIPTION OF THE INVENTION

Figure 1A:
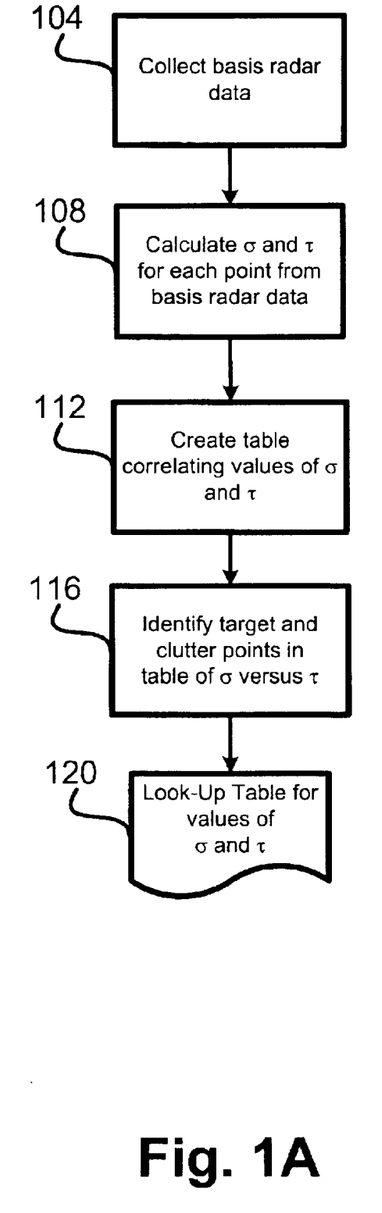
FIG. 1A is a flow chart showing a routine for constructing a look-up table used in an exemplary embodiment of the present invention.

FIG. 1A is a flowchart of a routine for constructing a look-up table used in an exemplary embodiment of the present invention which ultimately will be used to automatically identify targets in radar data. At a block 104, basis radar data is collected. At block 104, a representative area of territory is scanned with radar and the data is recorded. In a preferred embodiment, the radar used is multiple polarization radar. The representative area may include known, predetermined targets and known, predetermined clutter, some of which may be of natural origin, and some of which may be cultural in nature. For example, radar scans may be expected to collect data that represents objects of natural origin, such as trees, grass, and other flora which do not represent desired targets. Similarly, the radar scans may collect data that represents items of cultural origin, such as streets and buildings which also may not represent selected targets. Control objects also may be used, such as reflectors that yield expected radar echoes, to create a representative but controlled set of basis radar data for use in creating the look-up table.

Once the basis radar data has been collected, the data is processed at a block 108 to calculate the values used in the look-up table. Specifically, the values calculated are derived from a scattering matrix. The nature of the scattering matrix is fully described in W. L. Cameron and L. K. Leung, "Feature Motivated Polarization Scattering Matrix Decomposition," IEEE 1990 International Radar Conference Record, Arlington, Va. (conference held May 7, 1990, through May 10, 1990), the contents of which are incorporated by references. Elemental radar scatterers are represented by polarization scattering matrices. The scattering matrix of an elemental scatterer contains all the information needed to predict the radar signal which will be returned from the scatterer when it is illuminated by a transmit signal which has an arbitrary, but known, polarization state. From the scattering matrix, as is described in detail in the referenced article, values which can delineate between target points and clutter points are derived.

A full polarization scattering matrix includes two single polarization components, horizontal transmit/receive data (HH) and vertical transmit/receive data (VV), and two cross polarization components, vertical transmit/horizontal receive data (VH), and horizontal transmit/vertical receive data (HV):

$$S = \begin{pmatrix} HH & VH \\ HV & VV \end{pmatrix} \tag{1}$$

From this matrix, a scattering matrix decomposition is derived:

$$S = \sigma[\cos(\theta)(\cos(\tau)S_{max} + \sin(\tau)S_{min}) + \sin(\theta)S_{NR}] \tag{2}$$

where:

σ represents total radar cross section, which is a function of the size of the object and the electromagnetic properties of the object;

τ is the asymmetry angle, which is a function of the geometric complexity of the object; and θ is the reciprocity angle, which is a function of the electromagnetic properties of the material.

Algebraically, equation (2) can be solved to yield numerical values for σ, τ, and θ from the radar data matrix S comprised of the single polarization and cross polarization data.

Much of the accuracy of an exemplary embodiment of the present invention can be realized using only one of the cross polarization data sets. While the highest accuracy is achieved using both single polarization data sets HH and VV that are available when using multiple polarization radar, much of the accuracy of the present invention can be recovered using data from only VH or HV without having to measure and calculate both. In equation (2), elimination of one of the cross polarization data sets eliminates the last term of the expression, $\sin(\theta)S_{NR}$, which has only a small effect on the result of the calculations.

Total radar cross section σ has previously been used to attempt to automate the identification of targets. As is known, total radar cross section σ is an indication of how broadly and strongly an object reflects a radar signal. Manmade objects tend to have a greater total radar cross section ≐ than most objects of natural origin. However, many manmade objects, such as radio towers and buildings, may have a high total radar cross section ≐ but not represent a target of interest. Similarly, many natural objects, such as tree lines or rock formations, also might yield a high total radar cross section σ. Accordingly, while there is some correlation between an object's total radar cross section σ and its likelihood to be a desired target, using total radar cross section σ as a sole indicator of targetworthiness has shortcomings. The lack of correlation between total radar cross section σ as an indicator of a target will be explained further below, with regard to FIG. 6.

By contrast, as is known, asymmetry angle τ gives an indication of the regularity of the shape of an object. Smaller manmade objects, such as vehicles or tanks, have a higher asymmetry angle τ than do natural objects or larger manmade objects. Advantageously combining an assessment of total radar cross section and asymmetry angle τ yields a highly accurate measure of what might represent a desired target. Accordingly, from the radar data collected in the scan of the representative area at the block 104, total radar cross section σ and asymmetry angle τ are calculated at a block 108 for each point covered in the radar scan.

Figure 2:
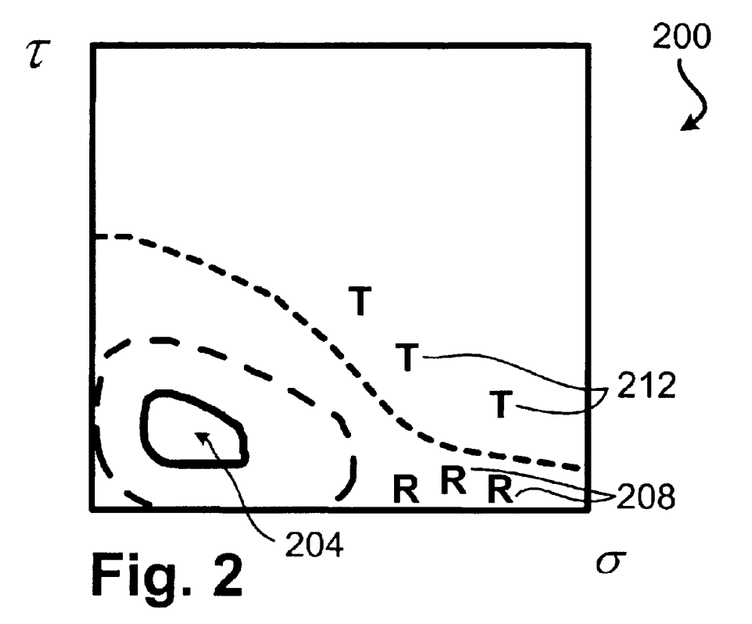
FIG. 2 is a two-dimensional distribution plotting radar cross-sectional area (σ) and asymmetry angle (τ)

FIG. 2 is a graph 200 showing a two-dimensional distribution of total radar cross section σ on the x-axis and asymmetry angle τ on the y-axis. Total radar cross section σ is a ratio, graphed with zero decibels in the center of the graph with lower ratios extending to the left and higher ratios extending to the right. Asymmetry angle τ is plotted from zero to forty-five degrees. FIG. 2 shows the density of combinations of values of total radar cross section σ and asymmetry angle τ, the highest density represented by the light-colored area 204 in the lower left quadrant of the graph 200. It will be appreciated that most objects tend to have a low total radar cross section σ and a low-to-medium asymmetry angle τ. Also, reflectors used as controls in the radar scan each are plotted as an "R" 208 on the graph 200. Reflectors are highly regular in shape, and thus have a low asymmetry angle τ, as shown on the graph 200. However, reflectors by definition have a high total radar cross section σ, as also shown on the graph 200.

The graph 200 also shows a number of predetermined targets, each represented as a "T" 212 on the graph 200. Empirically, targets tend to have medium-to-high values of asymmetry angle τ for low values of total radar cross section σ, with the target asymmetry angle τ having generally lower values for higher values of total radar cross section σ. Thus, referring back to FIG. 1A, from the calculated values of total radar cross section σ and asymmetry angle τ, at a block 112 a basic two-dimensional look-up table can be created which can be used by an automatic target detection system.

Figure 3:
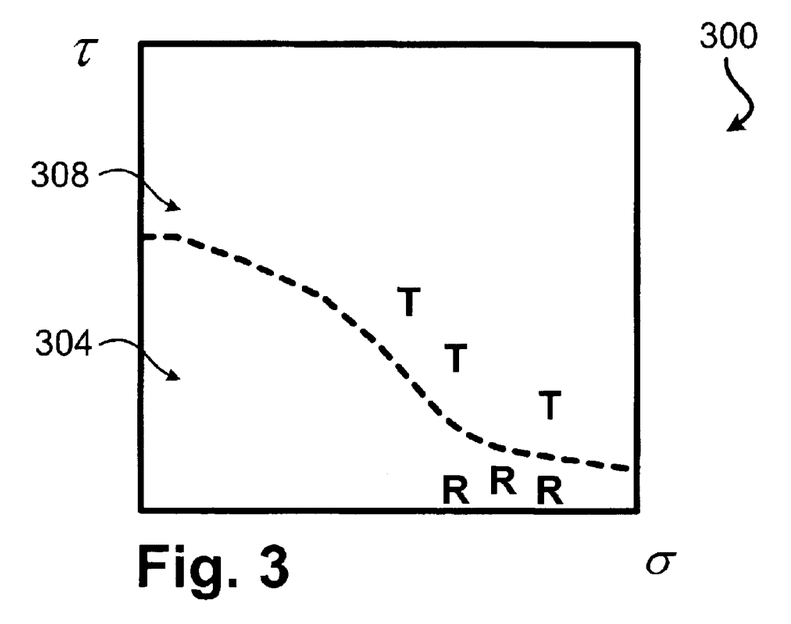
FIG. 3 is a rendering of a two-dimensional look-up table for values of σ versus τ.

Referring back to FIG. 2, it will be appreciated that the density of non-target clutter points, shown by the light-colored region 204 of the graph 200, is not significant to target detection. What is important is the distinction between which combinations of total radar cross section σ and asymmetry angle τ indicate targets, and which combinations indicate clutter (and thus do not represent targets). Accordingly, the distribution of empirically collected total radar cross section σ and asymmetry angle τ combinations of the graph 200 can be reduced to a binary plot of what are and are not targets, as shown in graph 300 of FIG. 3. Referring now to FIG. 3, as a starting point, for every combination of total radar cross section σ and asymmetry angle τ for which a certain number of hits represented a clutter point, that combination might be assigned to the clutter region, and the rest of the points assigned to the target region. In the graph 300, any objects whose combination of total radar cross section σ and asymmetry angle τ fall into a dark region 304 are clutter points, while any objects whose combination of total radar cross section σ and asymmetry angle τ fall into a light region 308 are targets. Thus, a two-dimensional plot can be derived that automatically can be consulted to identify targets from calculated working values of total radar cross section σ and asymmetry angle τ.

While conceptually shown as a black and white graph in FIG. 3 and other figures, the table actually suitably comprises a two-dimensional data array with entries in one dimension for total radar cross section σ and in another dimension for asymmetry angle τ. At each intersection of data values, the table might have a zero to represent that a data point with that combination of values should be considered a clutter point, and a one to represent a data point that should be considered a target point.

Figure 4:
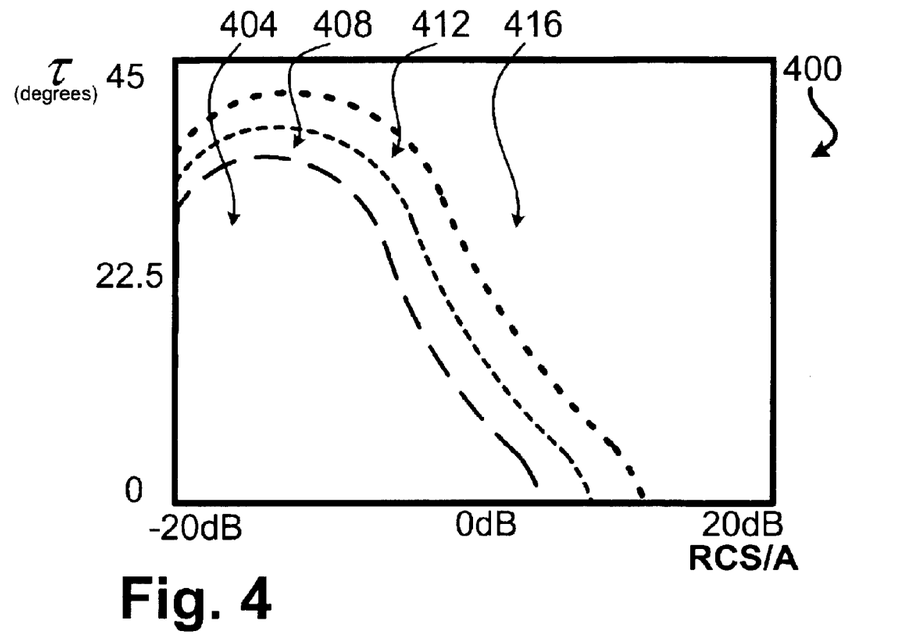
FIG. 4 is a composite two-dimensional distribution of σ versus τ for a number of radar passes over an exemplary target zone.

Referring back to FIG. 1A, at a block 116 it may be desirable to allow for adjusting of a boundary between combinations of values that are regarded as clutter and combinations of values that are regarded as targets. FIG. 4 shows a density distribution graph 400 of total radar cross section ÷ versus asymmetry angle. The light-colored region 404 shows the greatest density of combinations of total radar cross section or and asymmetry angle. Because most data points in a region of interest should represent clutter, the greatest density of combinations of values of radar cross section σ and asymmetry angle τ should fall into this region. In a next-most-lightly shaded region 408, a lower density of combinations reflecting clutter is found, with still lower densities of combinations of values found in regions 412 and 416, respectively. These densities provide a good initial assessment of a threshold between points that should be considered clutter points and points that should be considered target points.

Figure 5:
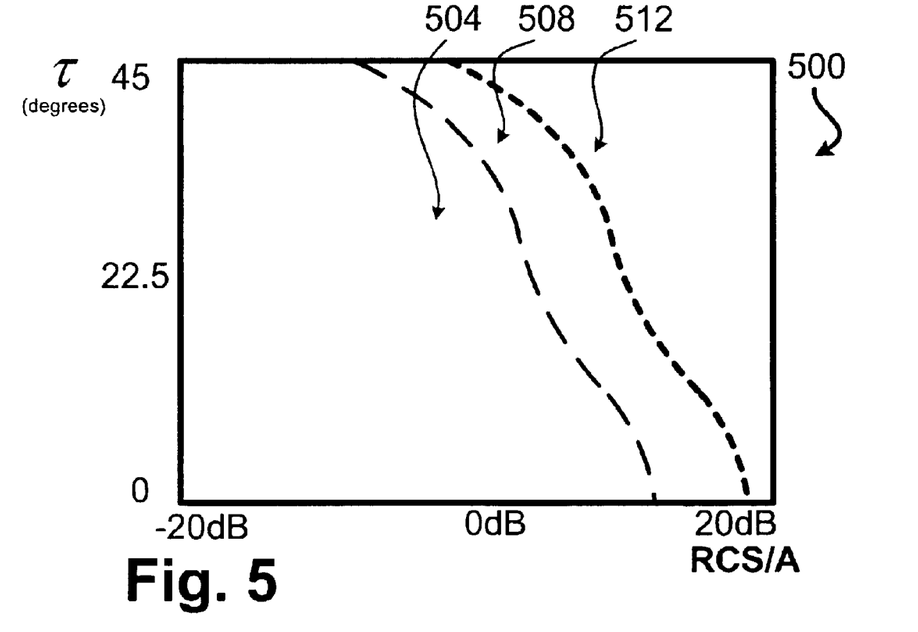
FIG. 5 is a two-dimensional distribution of σ versus τ for a number of radar passes over an exemplary target zone indicating false alarm rate across sections of the σ versus τ distribution of FIG. 4.

FIG. 5 shows a graph 500 empirically labeled to show how the breakpoint between clutter and target classifications might desirably be finely adjusted. In the graph 500, if objects in a gray region 504 are regarded as clutter and objects outside of a gray region 504 are regarded as targets, empirically that will result in a false alarm rate of about one hundred false alarms per square kilometer. However, if combinations of values in a gray region 504 and a white region 508 are regarded as clutter and objects in a black region 512 are regarded as targets, then the false alarm rate drops to only about ten false alarms per square kilometer. Anything in a dark region 512 should be regarded as a target. The relative density of these combinations which may or may not indicate clutter may invite further scrutiny and fine allocation of whether these combinations represent clutter points or target points.

Figure 6:
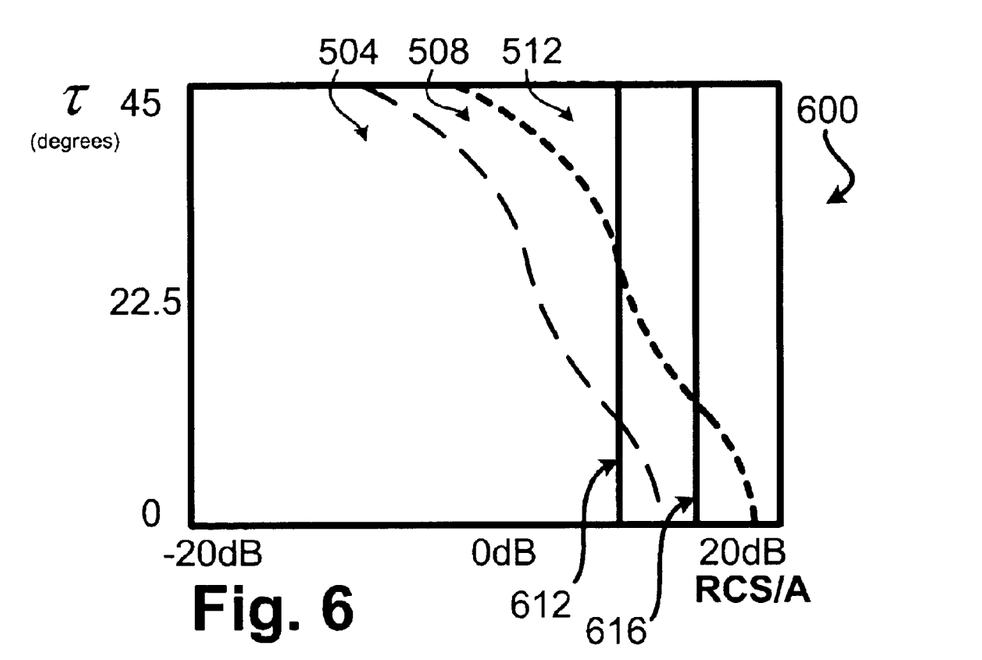
FIG. 6 is another two-dimensional distribution of σ versus τ for a number of radar passes over an exemplary target zone of FIG. 5.

For sake of illustration, FIG. 6 shows a graph 600 showing the same regions 504 and 508 showing combinations of total radar cross section σ and asymmetry angle τ resulting in false alarm rates of about one hundred false alarms per square kilometer and about ten false alarms per square kilometer, respectively. In addition, FIG. 6 also shows errors that could result if asymmetry angle τ were disregarded and instead total radar cross section ÷ were solely relied upon as a means for differentiating between clutter points and target points. At a first constant value 612 of total radar cross section, the false alarm rate per square kilometer is as high as one hundred false alarms per square kilometer. At low values of asymmetry angle, that choice of total radar cross section σ would yield many false alarms, whereas at higher values of asymmetry angle τ many points in the dark region 512 (FIG. 5) that should be regarded as targets would be disregarded as clutter. Moreover, the first value 612 of total radar cross section σ would overlook a great many points that should be considered targets. The total radar cross section σ threshold could be set to a higher value to reduce the number of false alarms for data points which happen to have a low asymmetry angle τ as shown at a threshold 616. However, choosing the value of total radar cross section σ at the threshold 616 would overlook even more potential targets, as shown by the larger area of the dark region 512 (FIG. 5) bounded by the threshold 616. Thus, it is important to differentiate the threshold between clutter points and target points with respect to both total radar cross section σ and asymmetry angle τ.

Figure 7:
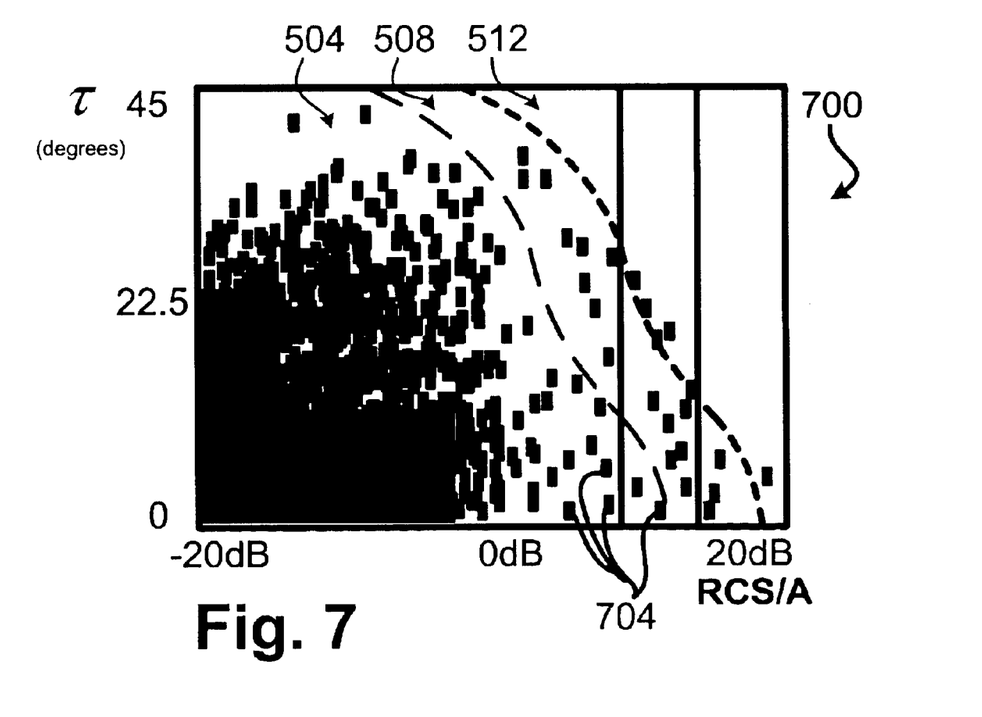
FIG. 7 is a two-dimensional distribution of σ versus τ for a number of radar passes over an exemplary target zone of FIG. 6.

Adjustments suitably can be made for the borderline cases presented by cultural clutter, as shown in the distribution 700 of FIG. 7. As previously described, some manmade structures do not present targets of interest, even though they may yield total radar cross section σ and asymmetry angle τ values which fall close to the baseline clutter/target threshold. The light pixels 704 in the distribution 700 represent cultural clutter that should be disregarded. Most of these combinations of values fall squarely in the high false alarm gray region 504 and easily can be disregarded. Some, however, fall near or in the target region 512, and suitably are accounted for to avoid an undesirable false alarm.

Figure 8:
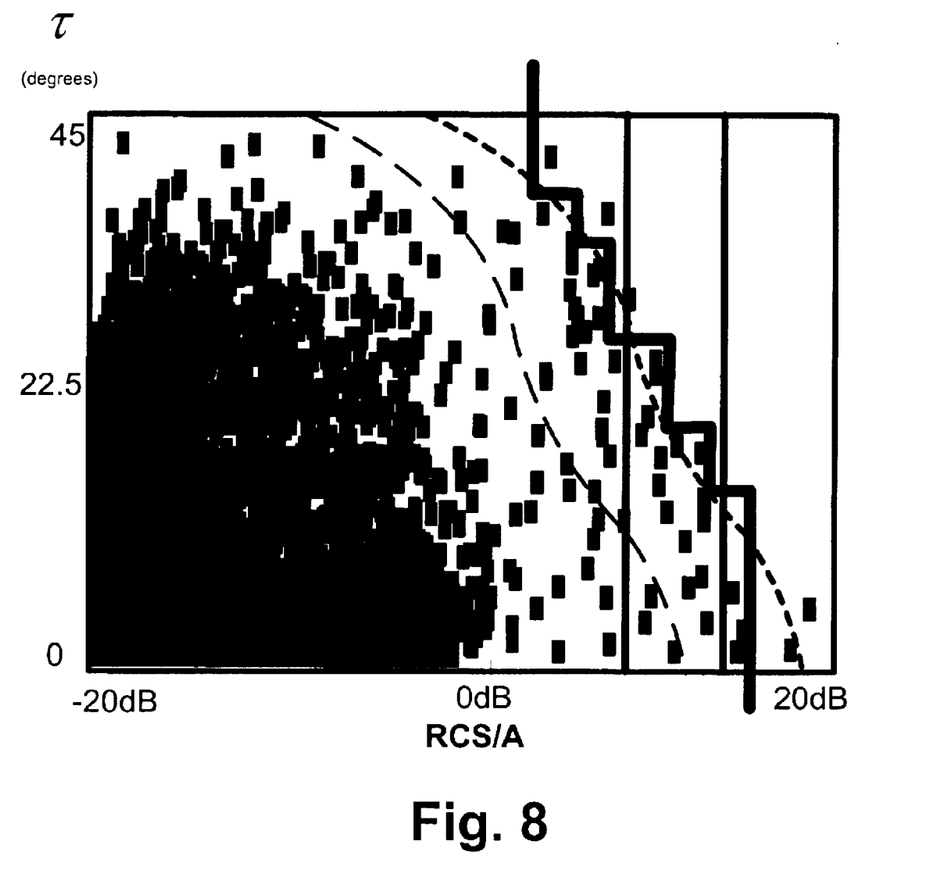
FIG. 8 is an enlarged view of a section of a distribution of σ versus τ.

FIG. 8 shows a graphic form representation of how the threshold can be adjusted for these combinations that might yield a false alarm. Between high false alarm regions, low false alarm regions, and no false alarm regions, the threshold can be manipulated to classify individual combination points as clutter or target points. As previously described, in a physical manifestation, this is suitably realized as a two-dimensional binary table; in this manifestation, individual data combinations could be defined manually as clutter points or target points. In sum, returning to FIG. 1A, a working look-up table 120 can be generated to support automatic detection of targets.

Figure 1B:
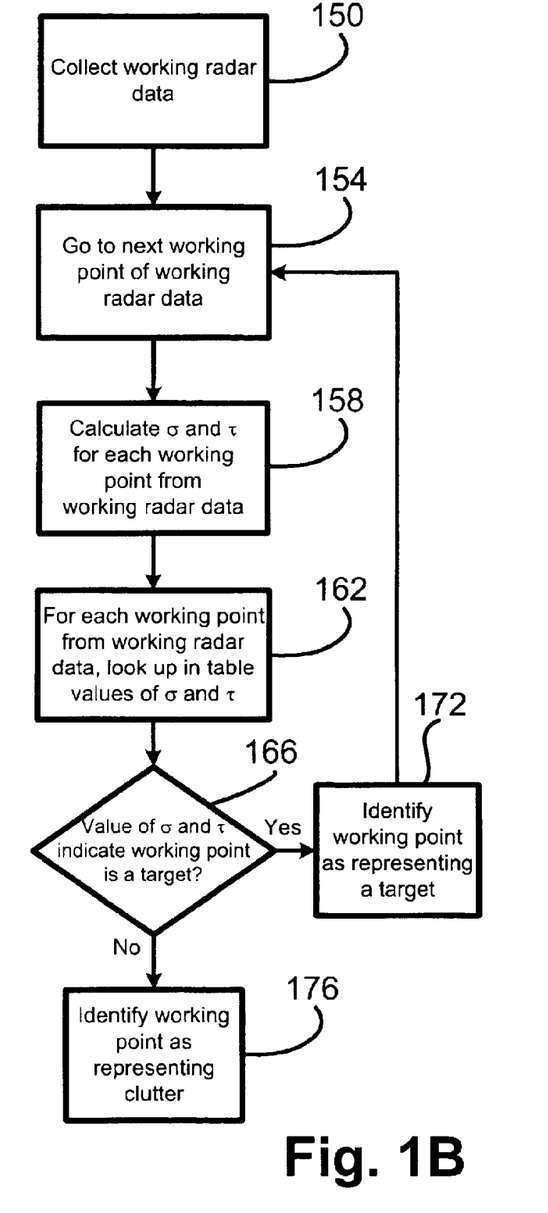
FIG. 1B is a flow chart showing a routine for identifying targets using the look-up table in an exemplary embodiment of the present invention.

FIG. 1B shows how the look-up table 120 (FIG. 1A) generated can be used. At a block 150, working radar data is collected. As previously described, full polarization radar might be used, or data from only one of the cross polarization data sets may be used. In a preferred embodiment, the same data sets should be used for collecting the working data as were used for building the look-up table as described in FIG. 1A.

Once the data has been collected, at a block 154 each point in the working data is examined. At a block 158, the total radar cross section σ and the asymmetry angle τ are calculated from the scattering matrix, similar to how those values were calculated in compiling the basis data. At a block 162, each of these values of the total radar cross section σ and the asymmetry angle τ is looked up in the look-up table 120 (FIG. 1A). At a decision block 166, if the combination of values of total radar cross section σ and asymmetry angle τ looked up have been previously classified as a target, the data point is identified as a target at a block 172. On the other hand, if the combination of values of total radar cross section σ and asymmetry angle τ has been previously classified as clutter, the data point is represented as clutter at a block 176 and disregarded. The process continues for each working data point at block 154.

Figure 9:
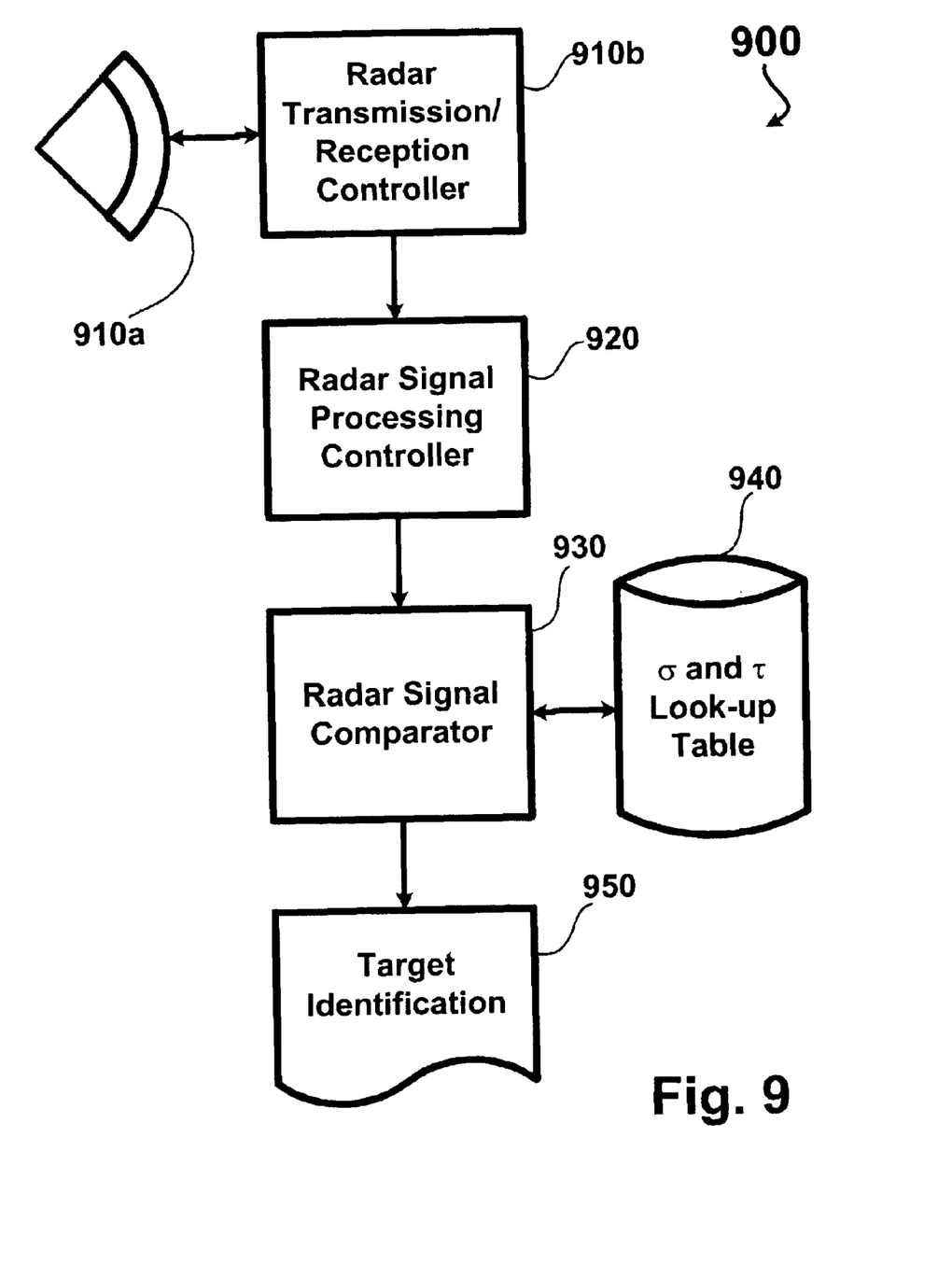
FIG. 9 is a block diagram for a system using an embodiment of the present invention to automatically identify targets in received radar data.

A radar transceiving and processing system 900 employing this process is shown in FIG. 9. A radar transceiver 910 transmits and receives multiple polarization radar signals under the direction of a radar transmission/reception controller 910 to gather radar data for each data point under study. The radar transceiver 910 and the radar transmission/reception 920 controller in one embodiment comprise a synthetic aperture radar system. A typical synthetic aperture radar system is carried by an airborne or space-borne platform, and produces a two-dimensional image. One dimension in the image is called range (or cross track) and is a measure of the distance from the radar transceiver to the object being scanned. Range to the object is determined by measuring the time from transmission of a pulse to receiving the echo from a target. The other dimension is azimuth (or along track) and is perpendicular to range. Synthetic aperture radar produces relatively fine azimuth resolution without physically large antennae, as is understood in the art. Synthetic aperture multiple polarization radar systems send and receive signals in perpendicular planes. For example, such a system may send and receive signals in orthogonal planes, the intersection of which contains a radar line-of-sight, resulting in the four sets of data previously described. Because the radar platform is moving, adjustments are made for the Doppler shifts otherwise arising from the relative motion between the radar platform and the objects being scanned.

The data collected by the controller 910 is passed to a radar signal processing controller 920, which calculates the scattering matrix data previously described in connection with FIG. 1A. The radar transceiving and processing system 900, the radar signal transmission reception controller 910, and the radar signal processing controller 920 all may be used not only to gather and process working radar data, but also to collect and process the data used to create the look-up table.

Once the computations of total radar cross section σ and asymmetry angle τ have been performed by the radar signal processing controller 920, the total radar cross section σ and asymmetry angle τ are passed to a radar signal comparator 930. The comparator uses a previously created look-up table 940 to determine, based on the values of total radar cross section σ and asymmetry angle, whether the data point under study should be classified as target point or a clutter point. A target identification report 950 is thereby generated, automatically identifying desired targets.

While preferred embodiments of the invention have been illustrated and described, many changes can be made to these embodiments without departing from the spirit and scope of the invention. Accordingly, the scope of the invention is not limited by the disclosure of the preferred embodiments. Instead, the scope of the invention should be determined entirely by reference to the claims that follow.

What is claimed is:

1. A method for detecting targets in radar signals comprising the steps of:
    calculating for a working point in a working radar data a working total radar cross section and a working asymmetry angle from a working scattering matrix;
    evaluating the working total radar cross section and the working asymmetry angle to determine whether the working point should be classified as a target point or a clutter point.

2. The method of claim 1, further comprising the step of creating a look-up table from a basis radar data associating combinations of a total radar cross section and an asymmetry angle representing target points and clutter points such that the working total radar cross section and the working asymmetry angle for the working point can be looked up in the look-up table to classify the working point as a target point or a clutter point.

3. The method of claim 1, further comprising collecting working radar data for a working area of interest having a plurality of working points.

4. The method of claim 3, wherein the working radar data for the area of interest is collected using synthetic aperture radar.

5. The method of claim 1, wherein the working scattering matrix is derived from working vertical single pole data, working horizontal single pole data, and working cross pole data, the working cross pole data being derived from at least one of a working vertical transmit and horizontal receive scan or a working horizontal transmit and vertical receive scan.

6. The method of claim 1, wherein the working scattering matrix derived from working vertical single pole data, working horizontal single pole data, and working cross pole data, the working cross pole data being derived from a working vertical transmit and horizontal receive scan and a working horizontal transmit and vertical receive scan.

7. The method of claim 2, further comprising the step of generating the look-up table of the total radar cross section versus the asymmetry angle by:
    calculating for a plurality of basis points in the basis radar data the total radar cross section and the asymmetry angle from a basis scattering matrix;

generating the look-up table of the total radar cross section versus the asymmetry angle for the plurality of points in the basis radar data; and classifying in the look-up table which combinations of the total radar cross section and the asymmetry angle represent target points and clutter points.

8. The method of claim 7, further comprising collecting the basis radar data for a representative area of interest.

9. The method of claim 8, wherein the basis radar data for the representative area of interest is collected using synthetic aperture radar.

10. The method of claim 7, further comprising calculating for the plurality of basis points in the basis radar data the total radar cross section and the asymmetry angle from the basis scattering matrix derived from basis vertical single pole data, basis horizontal single pole data, and basis cross pole data, the basis cross pole data being derived from at least one of a basis vertical transmit and horizontal receive scan or a basis horizontal transmit and vertical receive scan.

11. The method of claim 7, further comprising calculating for the plurality of basis points in the basis radar data the total radar cross section and the asymmetry angle from the basis scattering matrix derived from basis vertical single pole data, basis horizontal single pole data, and basis cross pole data, the basis cross pole being derived from a basis vertical transmit and horizontal receive scan and a basis horizontal transmit and vertical receive scan.

12. The method of claim 7, wherein the classifying in the look-up table which combinations of the total radar cross section and the asymmetry angle represent target points and clutter points is performed manually by comparing the basis radar data for the representative area of interest with observational data showing positions of the target points and the clutter points.

13. The method of claim 12, wherein the identifying of the target points and the clutter points in the look-up table is manually adjusted to classify predetermined clutter points.

14. A method for detecting targets in radar signals, the method comprising the steps of:

calculating for a plurality of basis points in a basis radar data a total radar cross section and an asymmetry angle from a basis scattering matrix;

generating a look-up table of the total radar cross section versus the asymmetry angle for the plurality of basis points in the basis radar data;

classifying in the look-up table which combinations of the total radar cross section and the asymmetry angle represent target points and clutter points;

calculating for a working point in a working radar data a working total radar cross section and a working asymmetry angle from a working scattering matrix;

comparing values of the working total radar cross section and the working asymmetry angle to the look-up table; and reading from the look-up table whether a combination of the total radar cross section corresponding with the working total radar cross section and the asymmetry angle corresponding with the working asymmetry angle is classified as a target point or a clutter point.

15. The method of claim 14, further comprising the step of collecting working radar data for a working area of interest having a plurality of working points.

16. The method of claim 15, wherein the working radar data for the area of interest is collected using synthetic aperture radar.

17. The method of claim 14, wherein the working scattering matrix is derived from working vertical single pole data, working horizontal single pole data, and working cross pole data, the working cross pole data being derived from at least one of a working vertical transmit and horizontal receive scan or a working horizontal transmit and vertical receive scan.

18. The method of claim 14, wherein the working scattering matrix is derived from working vertical single pole data, working horizontal single pole data, and working cross pole data, the working cross pole data being derived from a working vertical transmit and horizontal receive scan and a working horizontal transmit and vertical receive scan.

19. The method of claim 14, further comprising the step of collecting basis radar data for a representative area of interest.

20. The method of claim 19, wherein the basis radar data for the representative area of interest is collected using synthetic aperture radar.

21. The method of claim 14, further comprising calculating for the plurality of basis points in the basis radar data the total radar cross section and the asymmetry angle from the basis scattering matrix derived from basis vertical single pole data, basis horizontal single pole data, and basis cross pole data, the basis cross pole data being derived from at least one of a basis vertical transmit and horizontal receive scan or a basis horizontal transmit and vertical receive scan.

22. The method of claim 14, further comprising calculating for the plurality of basis points in the basis radar data the total radar cross section and the asymmetry angle from the basis scattering matrix derived from basis vertical single pole data, basis horizontal single pole data, and basis cross pole data, the basis cross pole data being derived from a basis vertical transmit and horizontal receive scan and a basis horizontal transmit and vertical receive scan.

23. The method of claim 14, wherein the classifying in the look-up table which combinations of the total radar cross section and the asymmetry angle represent target points and clutter points is performed manually by comparing the basis radar data for the representative area of interest with observational data showing positions of the target points and the clutter points.

24. The method of claim 23, wherein the identifying of the target points and the clutter points in the look-up table is manually adjusted to classify predetermined clutter points.

25. A method of generating a look-up table to be used for detecting targets in radar signals, the method comprising the steps of:

calculating for a plurality of basis points in a basis radar data a basis total radar cross section and an asymmetry angle from a basis scattering matrix;

generating a look-up table of the total radar cross section versus the asymmetry angle for the plurality of points in the basis radar data; and identifying in the look-up table which combinations of the total radar cross section and the asymmetry angle represent target points and clutter points.

26. The method of claim 25, further comprising the step of collecting the basis radar data for a representative area of interest.

27. The method of claim 26, wherein the basis radar data for the representative area of interest is collected using synthetic aperture radar.

28. The method of claim 25, wherein the basis scattering matrix is derived from basis vertical single pole data, basis horizontal single pole data, and basis cross pole data, the basis cross pole data being derived from at least one of a basis vertical transmit and horizontal receive scan or a basis horizontal transmit and vertical receive scan.

29. The method of claim 25, wherein the basis scattering matrix is derived from basis vertical single pole data, basis horizontal single pole data, and basis cross pole data, the basis cross pole data being derived from a basis vertical transmit and horizontal receive scan and a basis horizontal transmit and vertical receive scan.

30. The method of claim 25, wherein the classifying in the look-up table which combinations of the total radar cross section and the asymmetry angle represent target points and clutter points is performed manually by comparing the basis radar data for the representative area of interest with observational data showing positions of the target points and the clutter points.

31. The method of claim 30, wherein the identifying of the target points and the clutter points in the look-up table is manually adjusted to classify predetermined clutter points.

32. A system for detecting targets in radar signals comprising:
a radar transceiver operable to collect working radar data for a working area of interest;
a signal processor for calculating for at least one working point in the working radar data a working total radar cross section and a working asymmetry angle from a working scattering matrix, and determining whether the working point is classified as a target point or a clutter point.

33. The system of claim 32, further comprising a look-up table correlating a total radar cross section versus an asymmetry angle identifying combinations of the total radar cross section and the asymmetry angle representing target points and clutter points, and a comparator for reading from the look-up table whether a combination of the total radar cross section corresponding with the working total radar cross section and the asymmetry angle corresponding with the working asymmetry angle to classify the working point as a target point or a clutter point.

34. The system of claim 33, wherein the look-up table is derived from a collection of basis radar data for a representative area of interest.

35. The system of claim 33, wherein the working scattering matrix is derived from working vertical single pole data, working horizontal single pole data, and working cross pole data, the working cross pole data being derived from at least one of a working vertical transmit and horizontal receive scan or a working horizontal transmit and vertical receive scan.

36. The system of claim 33, wherein the working scattering matrix is derived from working vertical single pole data, working horizontal single pole data, and working cross pole data, the working cross pole data being derived from a working vertical transmit and horizontal receive scan and a working horizontal transmit and vertical receive scan.

37. The system of claim 34, wherein a basis scattering matrix is derived from basis vertical single pole data, basis horizontal single pole data, and basis cross pole data, the basis cross pole data being derived from at least one of a basis vertical transmit and horizontal receive scan or a basis horizontal transmit and vertical receive scan.

38. The system of claim 34, wherein a basis scattering matrix is derived from basis vertical single pole data, basis horizontal single pole data, and basis cross pole data, the basis cross pole data being derived from a basis vertical transmit and horizontal receive scan and a basis horizontal transmit and vertical receive scan.

39. The system of claim 34, wherein selected combinations of the total radar cross section and the asymmetry angle represent target points and clutter points.

40. The system of claim 33, wherein the working radar data for the representative area of interest is collected using synthetic aperture radar.

41. The system of claim 34, wherein the basis radar data for the area of interest is collected using synthetic aperture radar.

42. The system of claim 34, wherein identifications in the look-up table of the target points and the clutter points are derived manually by comparing the basis radar data for the representative area of interest with observational data showing positions of the target points and the clutter points.

43. The system of claim 34, wherein identification in the look-up table of the target points and the clutter points is manually adjusted to classify predetermined clutter points.

44. A computer readable medium having stored thereon instructions for detecting targets in radar signals, the computer readable medium having stored thereon instructions comprising:
calculating for a working point in a working radar data a working total radar cross section and a working asymmetry angle from a working scattering matrix;
evaluating the working total radar cross section and the working asymmetry angle to determine whether the working point should be classified as a target point or a clutter point.

45. The computer readable medium of claim 44, further comprising instructions for creating a look-up table associating combinations of a total radar cross section and an asymmetry angle representing target points and clutter points such that the working total radar cross section and the working asymmetry angle for the working point can be looked up in the look-up table to classify the working point as a target point or a clutter point.

46. The computer readable medium of claim 44, further comprising instructions for collecting working radar data for a working area of interest having a plurality of working points.

47. The computer readable medium of claim 44, wherein the working radar data for the area of interest is collected using synthetic aperture radar.

48. The computer readable medium of claim 44, wherein the working scattering matrix is derived from working vertical single pole data, working horizontal single pole data, and working cross pole data, the working cross pole data being derived from at least one of working vertical transmit and horizontal receive scan or a working horizontal transmit and vertical receive scan.

49. The computer readable medium of claim 44, wherein the working scattering matrix derived from working vertical single pole data, working horizontal single pole data, and working cross pole data, the working cross pole data being derived from a working vertical transmit and horizontal receive scan and a working horizontal transmit and vertical receive scan.

50. The method of claim 45, further comprising instructions for generating the look-up table of the total radar cross section versus the asymmetry angle by:
calculating for a plurality of basis points in the basis radar data the total radar cross section and the asymmetry angle from a basis scattering matrix;
generating the look-up table of the total radar cross section versus the asymmetry angle for the plurality of points in the basis radar data; and
classifying in the look-up table which combinations of the total radar cross section and the asymmetry angle represent target points and clutter points.

51. The computer readable medium of claim 50, further comprising instructions for collecting basis radar data for a representative area of interest.

52. The computer readable medium of claim 51, wherein the basis radar data for the representative area of interest is collected using synthetic aperture radar.

53. The computer readable medium of claim 50, further comprising instructions for calculating for the plurality of basis points in the basis radar data the total radar cross section and the asymmetry angle from the basis scattering matrix derived from basis vertical single pole data, basis horizontal single pole data, and basis cross pole data, the basis cross pole data being derived from at least one of a basis vertical transmit and horizontal receive scan or a basis horizontal transmit and vertical receive scan.

54. The computer readable medium of claim 50, further comprising instructions for calculating for the plurality of basis points in the basis radar data the total radar cross section and the asymmetry angle from the basis scattering matrix derived from a basis vertical single pole data, a basis horizontal single pole data, and basis cross pole data, the basis cross pole data being derived from a basis vertical transmit and horizontal receive scan and a basis horizontal transmit and vertical receive scan.

55. The computer readable medium of claim 50, wherein the classifying in the look-up table which combinations of the total radar cross section and the asymmetry angle represent target points and clutter points is performed manually by comparing the basis radar data for the representative area of interest with observational data showing positions of the target points and the clutter points.

56. The computer readable medium of claim 55, wherein the identifying of the target points and the clutter points in the look-up table is manually adjusted to classify predetermined clutter points.

\* \* \* \* \*